Figure 1:
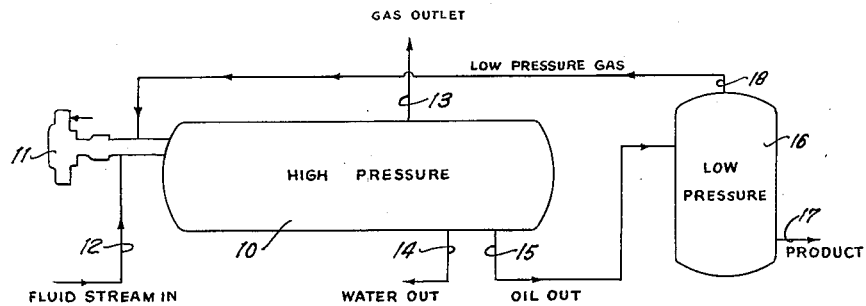

Oct. 2, 1956

C. O. MEYERS 2,765,045

METHODS AND MEANS FOR SEPARATING OIL AND GAS

Filed March 3, 1955

3 Sheets-Sheet 1

INVENTOR
Charles O. Meyers

BY Ashley & Ashley

ATTORNEYS

Oct. 2, 1956     C. O. MEYERS     2,765,045
METHODS AND MEANS FOR SEPARATING OIL AND GAS
Filed March 3, 1955     3 Sheets-Sheet 2

INVENTOR
Charles O. Meyers
BY Ashley & Ashley
ATTORNEYS

Oct. 2, 1956

C. O. MEYERS 2,765,045

METHODS AND MEANS FOR SEPARATING OIL AND GAS

Filed March 3, 1955

3 Sheets-Sheet 3

INVENTOR
Charles O. Meyers

BY *Ashley & Ashley*

ATTORNEYS

United States Patent Office 2,765,045
Patented Oct. 2, 1956

2,765,045

METHODS AND MEANS FOR SEPARATING OIL AND GAS

Charles O. Meyers, Tulsa, Okla., assignor to National Tank Company, Tulsa, Okla., a corporation of Nevada Application March 3, 1955, Serial No. 491,861

13 Claims. (Cl. 183—2.7)

This invention relates to new and useful improvements in methods and means for separating oil and gas.

The invention is particularly concerned with separating methods and means for high pressure predominantly gaseous, well flow streams wherein the well stream is subjected to a large pressure drop in a jet pump or ejector system as it enters a high pressure separation vessel, the separated hydrocarbons being withdrawn and subjected to low pressure separation with the gaseous phase from the low pressure separation step being returned to the jet pump or ejector system and reintroduced thereby into the high pressure stage.

There are many petroleum wells producing a high pressure flow stream at pressures of several thousand pounds per square inch, which streams contain large quantities of gas, but also contain appreciable quantities of liquefiable hydrocarbons. It is the practice to pass these well streams through a relatively large pressure drop, which may be of the magnitude of a thousand or several thousand pounds per square inch, to effect a separation of the gas from the liquid hydrocarbons following the pressure drop, and to further separate or stabilize the recovered liquids by introduction into a low pressure separating zone wherein gas and hydrocarbons difficult of liquefaction are removed to provide a stable liquid hydrocarbon product which is readily stored and handled. The gas separated in the high pressure stage normally is passed to a gas transmission pipeline, which may operate at 800 to 1200 pounds per square inch, but the gaseous phase from the low pressure stage, which may be at a pressure of 80 or 100 pounds per square inch cannot be salvaged by introduction into such a pipeline. Failure to recover this low pressure gas represents an economic loss, but usually, the loss is not of such magnitude as to warrant the operation of a compressor which will boost the pressure of the low pressure gas to a level at which it may be caused to flow into the high pressure separator or the gas transmission pipeline.

The present invention has as one object, therefore, to provide an improved method and means whereby the low pressure gas may be recovered from a low pressure separator and introduced into a zone of higher pressure through utilization of the pressure differentials normally existing in an oil and gas separation apparatus.

An important object of the invention is to provide an oil and gas separating method and means wherein a flow stream is passed through a relatively large pressure drop into a high pressure separator, the separated liquids are passed to a low pressure separation step wherein gas is evolved, and the low pressure gas is returned to the high pressure separation zone for conservation.

In the recovery of valuable condensible hydrocarbon liquids from a high pressure well stream, it is often desirable that the well stream be chilled by undergoing a pressure reduction. In most cases, it is desirable that the chilling be carried to as low a temperature as obtainable with the pressure drop available for use, and hence, it is desirable that work be extracted from the flowing well stream in order to enhance the degree of chilling obtained.

It is, therefore, an additional object of this invention to provide an improved method and means for the separation of a high pressure well stream into liquid and gas components wherein the well stream, in undergoing a pressure reduction upon entering a high pressure zone, is caused to do work and to reach lower temperatures by drawing gas from a low pressure separation zone and ejecting said low pressure gas into the high pressure separation zone.

Yet another object of the invention is to provide an improved method and means of the character described wherein the low pressure gas, in being returned to the high pressure separation zone, is substantially denuded of any valuable liquefiable hydrocarbons in the latter zone.

A particular object of the invention is to provide an improved method and means of the character described wherein an ejector system of one or two or several stages may be employed to regulate and control the compression ratios necessarily obtained in each stage.

A construction designed to carry out the invention will be hereinafter described together with other features of the invention.

Figure 2:
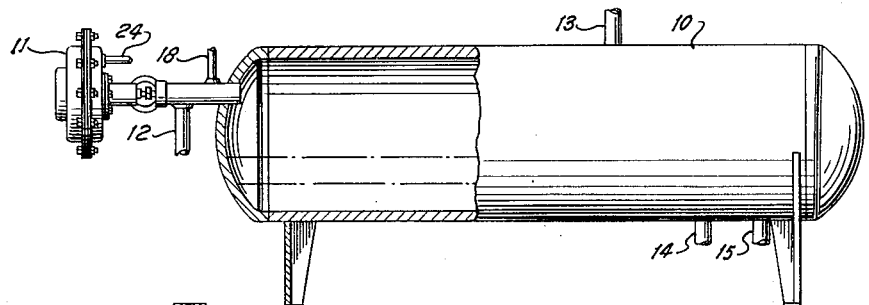
Figure 3:
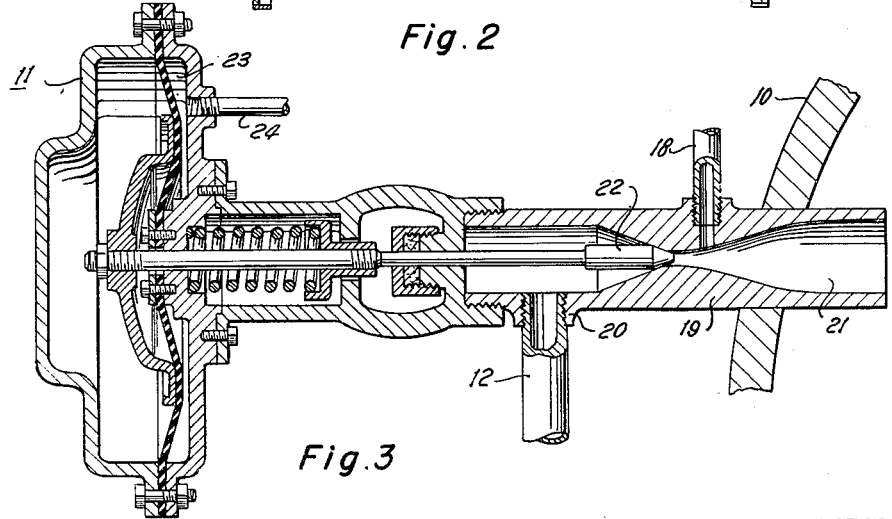
Figure 4:
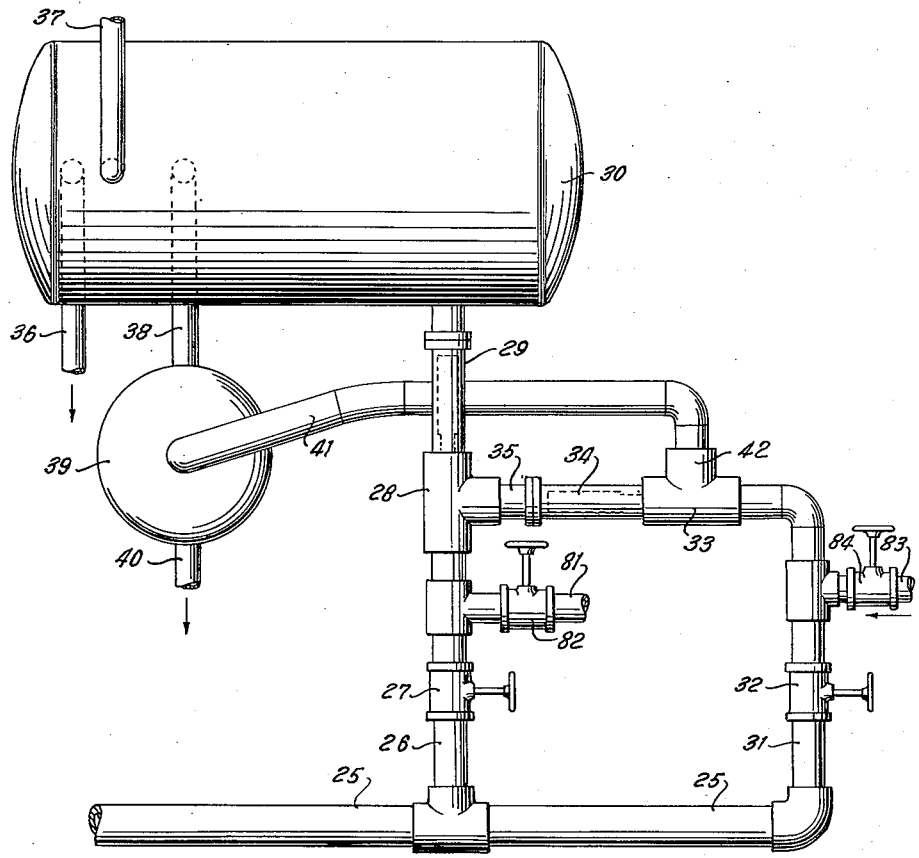
Figure 5:
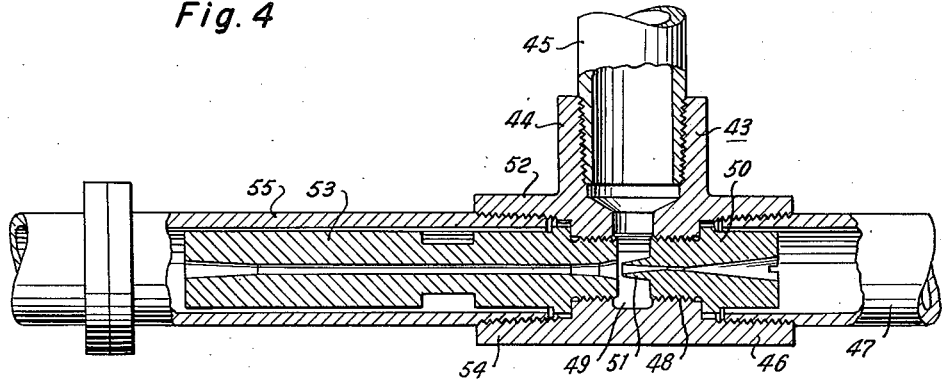
Figure 6:
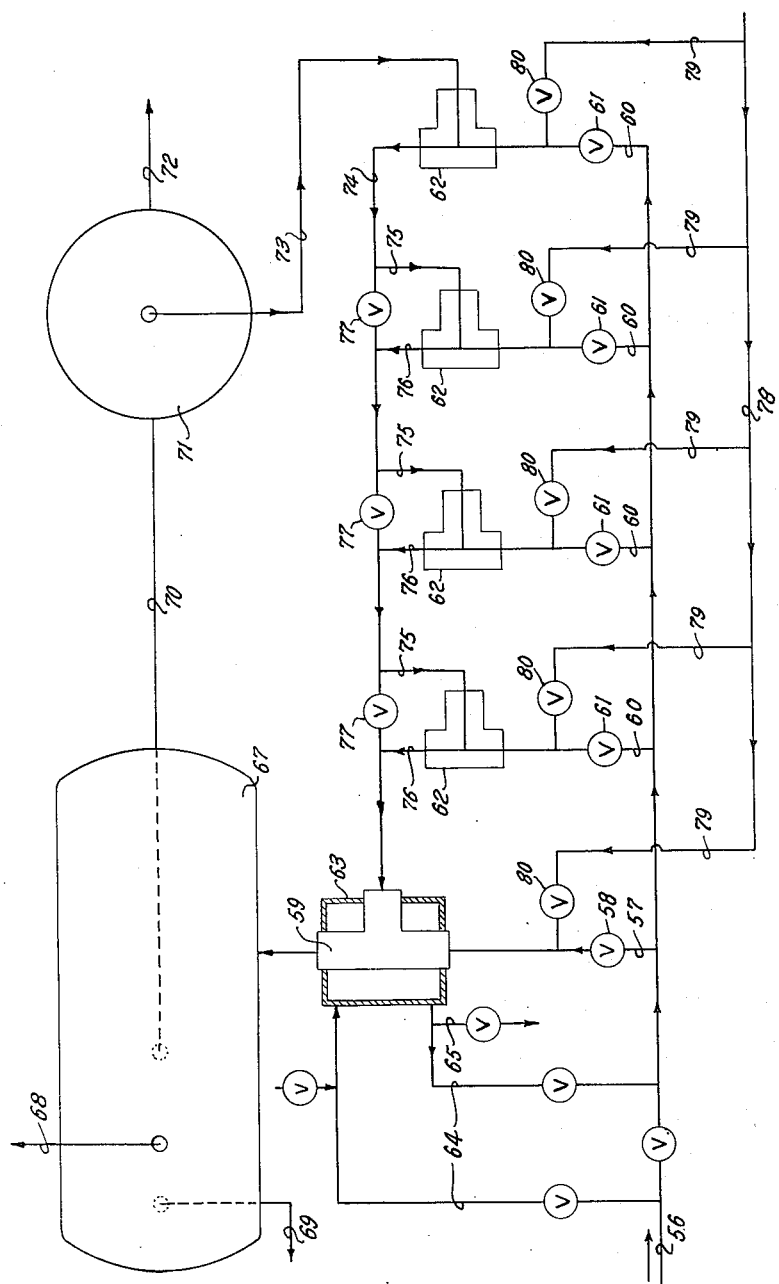

The invention will be more readily understood from a reading of the following specification and by reference to the accompanying drawings, wherein examples of the invention are shown, and wherein:

Fig. 1 is a diagrammatic view of a separating apparatus constructed in accordance with this invention and adapted to carry out the methods hereof, Fig. 2 is a side elevation, partly broken away, of the high pressure separating vessel of Fig. 1, Fig. 3 is an enlarged, longitudinal, sectional view of the jet pump or ejector structure, Fig. 4 is a plan view of a two-stage ejector modification of the invention, Fig. 5 is an enlarged, longitudinal, sectional view of one of the ejectors of Fig. 4, and Fig. 6 is a diagrammatic view of a further modification of the invention.

This application is a continuation-in-part of my copending application, Serial No. 421,755, filed April 8, 1954, now abandoned.

In the drawings, the numeral 10 designates a high pressure separating vessel which may be of any suitable or desirable type for the separating of a high pressure well stream into its gas, water, and liquid hydrocarbon components. A choke or pressure reduction structure 11, to be described hereinafter, forms a well stream inlet for the vessel 10, and has the well stream conductor 12 connected thereto. The vessel 10 is provided with a gas outlet 13, a water outlet 14, and a hydrocarbon or oil outlet 15.

Conventionally, the vessel 10 operates at an intermediate pressure in the neighborhood of 800 to 1200 pounds per square inch, this pressure normally being determined by the operating pressure of the gas transmission pipeline into which the gas outlet 13 is connected. The oil outlet line 15 is connected into a low pressure separator 16, a stabilizer, or other suitable or desirable structure functioning to remove from the discharged hydrocarbons a considerable quantity of the gas which will be present therein in order that there may be delivered from the low pressure vessel or other device 16 a stable hydrocarbon product flowing through the discharge conductor 17 to stock tanks or other storage means. The low pressure separator or stabilizer 16 will normally operate at a pressure in the general neighborhood of 100 pounds or less, and appreciable quantities of gas will be separated from the liquid hydrocarbons therein. This gas is drawn off from the vessel 16 through a gas outlet conductor 18, and heretofore, this low pressure gas has been largely wasted or consumed in uneconomical fashion.

The fluid stream entering the separating structure through the conductor 12 may be at a pressure of several thousand pounds per square inch, and it is apparent that this stream may undergo a pressure drop of from 1,000 to 3,000 pounds per square inch, or more, in passing through the choke or pressure reducing structure 11. In the present invention, the energy present in this flowing stream of high pressure fluid is employed to take the low pressure gas from the conductor 18 and force the same into the intermediate pressure vessel 10 whereby such gas is conserved and flows outwardly through the gas outlet 13 to the gas pipeline or other point of use or sale. All of the advantages of the usual type of separation structure in which a high pressure separation is carried out, followed by stabilization or low pressure separation, are realized with the present method and apparatus, and in addition, there is provided the additional benefit of recovering the exhaust gas from the low pressure vessel 16 under such pressure conditions that this gas may be marketed under acceptable pressure through the gas outlet conductor 13. Further, added chilling of the flow stream and substantial denuding of the low pressure gas are achieved.

The pressure reducing and ejector structure 11 is subject to much modification and may be of any suitable or desirable type. In general, such structures include a pressure reducing means, such as the variable choke illustrated in Fig. 3, and at some point in the flow path through such a pressure reducing means, there will be a zone in which the fluid stream reaches high velocities and consequently is under relatively low pressure. In the alternative, there may be employed jet structures having an aspirating action wherein the fluid jet functions to produce a low pressure in a chamber or enclosure into which the low pressure gas from the conductor 18 may be introduced. Jet pumps or ejectors, as such, being quite well known and existing in many forms, it is apparent that many physical embodiments of such structures may be employed to achieve pressure reduction in the well stream while creating a low pressure zone into which the low pressure gas may be drawn.

In the particular example illustrated in Fig. 3, there is provided a Venturi section 19 mounted in a wall of the vessel 10 and having a lateral, upstream inlet 20 into which the conductor 12 is connected. The conductor 18 leads into the throat of the Venturi section, in the zone in which high velocity and lowered pressural conditions of the flow stream exist due to the Venturi action. The Venturi functions to create a pressure drop in the well stream as it passes from the conductor 12 through the Venturi 19 and is discharged from the outlet 21 of the Venturi section into the interior of the vessel 10, and at the same time, low pressure gas is drawn from the vessel 16 through the conductor 18 into the throat of the Venturi section and thus forced into the vessel 10 under the pressure existent within the vessel 10. Raising the pressure of the gas entering through the conductor 18 requires work, and this work is necessarily extracted from the well stream flowing through the inlet conductor 12. Thus, in addition to the cooling effect observed because of the reduction in the pressure of the well stream, there is also a supplemental cooling effect obtained through the forcing of the well stream to do work while undergoing pressure reduction. The principles involved are well known and require no detailed explanation.

While the pressure reducing and ejector structure may have a fixed orifice or Venturi, in a practical structure, it is desirable that the rate of flow or degree of pressure reduction be variable or controllable. Various types of adjustable chokes or pressure reducing valves are readily available, the illustrated structure achieving variation and control by means of an elongate valve member or element 22 adapted to be moved axially of the Venturi section to increase or decrease the restriction afforded to flow of fluid through the Venturi section, the valve element, in this case, being operated by a diaphragm structure 23. The pressure connection 24 to the diaphragm unit and through which the exertion of pressure tends to reduce the restriction in the Venturi section, may be connected to the conductor 12 to hold a constant pressure thereon, but it is quite obvious that pressure connections may be made from either side of the diaphragm of the diaphragm unit to any suitable point in the system to regulate the pressure or flow through the Venturi section 19 as desired.

It is to be noted that no external structures, such as compressors and the like, are required, and that there is no expenditure of useful energy necessitated for the driving of such a compressor or other unit. The work utilized in compressing the low pressure gas from the vessel 16 and forcing the same into the high pressure vessel 10 is taken from a source which otherwise would be wasted or used to no avail, while the very extraction of this work from the well flow stream is made of benefit by increasing the desirable chilling of this well stream. Hence, what might be termed a cost-free source of energy is employed for recovery and conservation of the low pressure gas, and the additional advantage of more efficient cooling of the well stream is obtained.

The structure has been illustrated in somewhat simplified form, it normally not being feasible to employ threaded joints in high pressure apparatus, or not to protect the choke structure 11 against the very low temperatures which occur therein. Further, there has been no showing of the internal structure of the vessel 10 or the structures and elements normally present therein to effect proper and continuous separation of the well stream into its several components.

Because of the quite large pressure drop normally employed in equipment of this type, a marked cooling or chilling of the well stream occurs, and the high pressure separator 10 usually operates at a temperature of the magnitude of 0° F. Full separation and removal from the well stream of the desired hydrocarbons is thus attained. More important in the present instance, however, the low pressure gas scavenged by the jet pump structure is subjected to this low temperature and very efficient separation step whereby the low pressure gas is fully and thoroughly denuded of liquefiable hydrocarbons, and all of the gas discharged to the pipe line is effectively stripped of both hydrocarbon and aqueous vapors.

Modified, and in some cases preferred, forms of the invention are shown in Figs. 4, 5 and 6 of the drawings in which two or more ejector stages are employed for returning the low pressure gas from the low pressure separator to the low temperature, high pressure separator.

It is not always possible or practical to achieve within a single ejector stage the degree of compression, or compression ratio, desired for return of the low pressure gas to the high pressure separator. Hence, it may be desirable to employ two or more ejector stages, each being supplied with high pressure inlet gas, and each picking up the discharge from the next lower pressure ejector until the final outlet stream may be admitted directly into the high pressure separator.

In a two stage ejector system, as shown in Fig. 4, the high pressure well stream is admitted through a conductor 25 to a branch conductor 26 leading through a control valve 27 to the inlet of a secondary ejector structure 28 which discharges through the conductor 29 into the high pressure, low temperature separation vessel 30. The conductor 29 is also connected through a pipe 31 and a control valve 32 into the high pressure gas inlet of a primary ejector 33 having its discharge 34 connected into the low pressure inlet 35 of the secondary ejector 28. Separated water may be drawn off from the low temperature separator 30 through the drain or outlet conductor 36 while gas at intermediate or pipeline pressure is discharged therefrom through the gas outlet conductor 37. Separated hydrocarbons are withdrawn from the separator 30 through the pipe 38 to the low pressure separator or stabilizer column 39 wherein a considerable degree of stabilization is effected, with the stabilized liquid hydrocarbons being drawn off through the conductor 40 to suitable storage. The low pressure gas is taken from the separator or stabilizer 39 through the gas outlet conductor 41 to the low pressure or suction inlet 42 of the primary ejector 33.

For the purposes of explanation, let it be assumed that the well stream enters the system at a pressure of 3,000 pounds per square inch, that the low pressure separator or stabilizer column 39 is operating at a pressure of 95 pounds per square inch, that gas is being discharged from the low temperature separator at a pressure of 800 to 1,000 pounds per square inch, and that it is not possible or practical to raise the exhaust gas from the low pressure separator 39 to this pressure level through a single stage ejector. Under these conditions, as an example, something in the neighborhood of 5 pounds of 3,000 p. s. i. gas may be necessary or desirable as a high pressure gas supplied to the ejector 33 in order to withdraw 1 pound of gas at a pressure of 95 p. s. i. from the separator or stabilizer 39, and to discharge this total of 6 pounds of gas to the low pressure inlet 35 of the secondary ejector 28 at a pressure of 400 pounds per square inch. In turn, some 35 pounds of gas at a pressure of 3,000 pounds per square inch may be required as a high pressure gas supply to the secondary ejector 28 for each pound of gas at a pressure of 400 pounds per square inch brought in through the low pressure inlet 35. Thus, since very large quantities of gas are normally available and flowing through the conductor 25 and ultimately into the low temperature separator 30, the incoming gas flow may be split into several streams and flowed through more than one ejector in order to withdraw all of the low pressure gas from the separator or stabilizer 39 and reconvey the same into the low temperature separator 30. In these low temperature separation systems, a pressure drop for cooling purposes is normally a prerequisite, and so long as the entire gas stream undergoes this pressure drop without undue exposure and opportunity of picking up heat from the surrounding environment, such as the atmosphere, it is not particularly important to the low temperature ultimately achieved and the efficiency of separation obtained whether the incoming gas stream flows in a single stream through a pressure drop, or flows through several streams through several points of pressure reduction.

The ejectors are subject to much variation in structure, but a typical construction is shown in Fig. 5 of the drawings. The illustrated ejector consists essentially of a heavy walled gas conducting T 43 having a screw-threaded lateral branch 44 receiving the low pressure inlet gas conductor 45. The inlet branch 46 of the T receives an inlet high pressure gas conductor 47 and is provided with a reduced screw threaded, axial bore 48 opening into the aspirating chamber 49 located centrally of the T. A flanged inlet jet or nozzle member 50 is received in the reduced bore 48 and has a discharge nozzle 51 projecting into the chamber 49 and terminating in close proximity to the flared axial bore 52 of a discharge nozzle 53 carried in the outlet branch 54 of the T and being surrounded by and opening into the outlet gas discharge conductor 55 of the ejector. The high pressure gas stream, in flowing through the inlet nozzle 50 and passing through the aspirator chamber 49 at high velocity, will enter into the reduced bore 52 of the discharge nozzle 53, and at the same time, will draw with it into the discharge nozzle any low pressure gas which may be available through the inlet conductor 45.

In Fig. 6 of the drawings, there is illustrated diagrammatically a further modification of this system showing the simplicity with which any suitable or desirable number of the ejectors may be employed. Inlets or well stream pressures may vary widely in any particular well, as well as between different wells or oil fields, the low pressure separator or stabilizer may be operated at widely varying pressures, and the necessary pressure of the low temperature separator for discharge of gas to a pipe line or other point of use, may likewise vary considerably. Hence, it may be necessary to use one or two of the ejector structures, or a plurality of ejectors. The system of Fig. 6, and the method carried out thereby, is adapted to handle adequately and efficiently any of these various conditions which may arise.

As shown, the well or inlet stream is admitted through a conductor 56 having a branch conductor 57 extending through a valve 58 to the final stage ejector 59 and a plurality of parallel branch conductors 60 leading through control valves 61 to a plurality of intermediate ejectors 62. Since one or more of the ejectors may be subjected to relatively low temperatures, and since there may be likelihood of gas hydrate formation in said ejectors, one or more of the ejectors may be enclosed in a heating jacket 63, as shown in conjunction with the ejector 59. The incoming well stream, being relatively warm, or having been heated, may be conducted through the heating jacket 63 by means of the conductors 64 for imparting a degree of heat to the ejector 59, or other heating media may be supplied to the jacket 63 through the branch conductors 65 connected into the conductors 64. Similarly, any or all of the intermediate ejectors may be provided with suitable heating jackets.

The ejector 59 discharges through the pipe 66 into the low temperature, high pressure separator 67, which operates at a pressure considerably below that of the incoming gas stream, and which, by reason of the low temperature thereby obtained, functions to denude the gas stream of substantially all recoverable liquid hydrocarbons. Separated gas is discharged from the separator 67 through the gas outlet pipe 68 and carried to a pipeline, gasoline plant, or other point of use, while any separated moisture is withdrawn through the outlet conductor 69. The separated liquid hydrocarbons are taken from the separator 67 through the outlet conductors 70 to a low temperature separator or stabilizer column 71 from which stabilized liquids are withdrawn through the outlet pipe 72, and from which gas is discharged through the pipe 73 to the low pressure gas inlet of the first ejector 62 in the series of intermediate ejectors provided. The gas discharge of the ejector 62 is connected through a conductor 74 to the low pressure inlet of the ejector 59, and branch conductors 75 lead from the conductor 74 in parallel to the low pressure gas inlets of each of the remaining ejectors 62. Further, the gas outlets of each of the ejectors 62 are connected in parallel through the pipes 76 to the conductor 74, and a control valve 77 is provided for each ejector in the conductor 74 between the points of connection thereinto of the pipes 75 and 76 for each ejector. Thus, by opening the valve 77 and closing the valve 61 for any one of the ejectors 62, that ejector is rendered inoperative and does not function to compress the gas flowing through the conductor 74. On the other hand, by closing the valve 77 and opening the valve 61 of any of the ejectors, high pressure gas is admitted to the ejector whereby it is enabled to pick up low pressure gas through the conductor 75 from the conductor 74 and deliver this gas under increased pressure through its outlet gas pipe 76 and into the conductor 74 downstream of its closed valve 77. It is quite apparent that one or several or all of the ejectors may be used at one time and any suitable or desirable number of compression stages obtained.

In order to combat the problems of freezing or gas hydrate formation within the ejectors, as well as to permit the utilization of lower operating temperatures therein, it may be desirable to inject a hydrate inhibitor, such as a glycol or other antifreeze agent into the high pressure gas conductors 57 and 60 through which the inlet gas stream flows to the ejectors. For this purpose, an inhibitor manifold 78 is provided through which a suitable inhibitor is supplied under adequate pressure for introduction into the system. A branch conductor 79 is connected from the manifold 78 through a shutoff valve 80 into each of the high pressure gas conductors 60, as well as into the conductor 57. Thus, an inhibitor, such as diethylene glycol or triethylene glycol, may selectively be introduced into one or more of the ejectors to eliminate freezing or the formation of gas hydrates therein. Similarly, in the form of the invention illustrated in Fig. 4, a suitable inhibitor may be introduced into the pipe 26 through a branch pipe 81 and valve 82 opening into the pipe 26 upstream of the ejector 28, and inhibitor may be introduced into the conductor 31 upstream of the ejector 33 through a branch pipe 83 and valve 84.

In the operation of the modification shown in Fig. 6, all or any desired portion of the gas from the low pressure separator or stabilizer 71 is withdrawn through the conductor 73 to the first ejector 62, and there compressed by means of the high pressure gas admitted from the conductor 56 to the ejector. As required or found desirable, additional ones of the ejectors 62 may be brought into operation to boost the pressure of the gas flowing through the conductor or manifold 74 to a point at which it may be admitted to the ejector 59 and there compressed to a level sufficient to insure its entry into the low temperature separator 67. Normally, the bulk of the gas stream entering the system will flow through the conductor 57 and the ejector 59, but it is quite apparent that the stream may be split or divided among the several ejectors as found suitable or desirable. In any manner of operation, the gas stream is being caused to undergo a pressure reduction, and is being forced to do work in recompressing the low pressure gas from the separator or stabilizer 71, both of these operations causing a temperature reduction in the gas stream. Thus, the low temperature conditions for the separator 67 are not only achieved, but are enhanced, and at the same time, the low pressure gas is recovered and placed under sufficient pressure for conservation and sale.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of separating desirable liquefiable hydrocarbons from a predominantly gaseous high pressure well stream including the steps of, passing the well stream through a pressure reduction step at high velocity to create and maintain a low pressure area in direct communication with the high velocity well stream, discharging the well stream from the pressure reduction step into an intermediate pressure separating zone wherein the well stream separates into liquid and gaseous components, discharging gas at intermediate pressure from the intermediate pressure zone, withdrawing liquid from the intermediate pressure separating zone and discharging the liquid into a low pressure separating zone wherein gas is removed from the liquid, withdrawing liquid from the low pressure separating zone, and conducting gas from the low pressure separating zone to the low pressure area of the pressure reduction step.

2. The method of separating desirable liquefiable hydrocarbons from a predominantly gaseous high pressure well stream including the steps of, passing the well stream through a pressure reduction step at high velocity to create and maintain a low pressure area in direct communication with the high velocity well stream, discharging the well stream from the pressure reduction step into an intermediate pressure separating zone wherein the well stream separates into liquid and gaseous components, employing the high velocity well stream to draw gas from the low pressure area and compress said gas to the pressure of the intermediate pressure separating zone whereby work is extracted from the well stream to cool the same, discharging gas at intermediate pressure from the intermediate pressure separating zone, withdrawing liquid from the intermediate pressure separating zone and discharging the liquid into a low pressure separating zone wherein gas is removed from the liquid, withdrawing liquid from the low pressure separating zone, and conducting gas from the low pressure separating zone to the low pressure area of the pressure reduction step.

3. The method of conserving low pressure gas in the separation of liquids from a predominantly gaseous high pressure well stream including the steps of, passing the well stream under high pressure through a restricted flow space to increase the flowing velocity of the stream and create a low pressure area in direct communication with the well stream whereby low pressure gas is drawn from the low pressure area into the well stream, discharging the combined stream into an intermediate pressure separating zone, discharging gas and liquid from said zone, passing the liquid into a low pressure separating zone, discharging gas and liquid from the low pressure zone, and conducting the low pressure gas from the low pressure zone to the low pressure area in communication with the high velocity well stream to conserve the low pressure gas and return it to the intermediate pressure zone.

4. The method of separating desirable liquefiable hydrocarbons from a predominantly gaseous high pressure well stream including the steps of, passing the well stream through a pressure reduction step at high velocity to create and maintain a low pressure area in direct communication with the high velocity well stream and to cool the well stream, discharging the cold well stream from the pressure reduction step into an intermediate pressure cold separating zone wherein the well stream separates into liquid and gaseous components, discharging gas at intermediate pressure from the intermediate pressure zone, withdrawing liquid from the intermediate pressure separating zone and discharging the liquid into a low pressure separating zone wherein gas is removed from the liquid, withdrawing liquid from the low pressure separating zone, and conducting gas from the low pressure separating zone to the low pressure area of the pressure reduction step and conveying the gas from the low pressure separating zone with the well stream into the cold intermediate pressure separating zone.

5. The method of conserving low pressure gas in the separation of liquids from a predominantly gaseous high pressure well stream including the steps of, passing the well stream under high pressure through a venturi to increase the flowing velocity of the stream and create a low pressure area in the throat of the venturi, discharging the well stream from the venturi into an intermediate pressure separating zone, discharging gas and liquid from said zone, passing the liquid into a low pressure separating zone, discharging gas and liquid from the low pressure zone, and conducting the low pressure gas from the low pressure zone to the throat of the venturi, whereby the well stream does work in compressing the low pressure gas and discharging it into the intermediate pressure separating zone commingled with the well stream.

6. An apparatus for separating desirable liquefiable hydrocarbons from a predominantly gaseous high pressure well stream including, a high pressure liquid and gas separating vessel, a low pressure liquid and gas separating vessel, a gas discharge from the high pressure vessel, a liquid discharge from the high pressure vessel to the low pressure vessel, a liquid discharge from the low pressure vessel, a high pressure well stream conductor, a pressure reducing means connecting the conductor to the high pressure vessel, said means having a restricted flow passage through which the well stream flows to the high pressure vessel at high velocity, said means having a low pressure zone in communication with the restricted flow passage and maintained at low pressure by the flow of the well stream through the passage at a velocity higher than that at which it flows through the well stream conductor, and means for conducting low pressure gas from the low pressure separator to the low pressure zone.

7. An apparatus for separating desirable liquefiable hydrocarbons from a predominantly gaseous high pressure well stream including, a high pressure liquid and gas separating vessel, a low pressure liquid and gas separating vessel, a gas discharge from the high pressure vessel, a liquid discharge from the high pressure vessel to the low pressure vessel, a liquid discharge from the low pressure vessel, a high pressure well stream conductor, a pressure-reducing jet pump connecting the conductor to the high pressure vessel, said jet pump having a restricted flow passage through which the well stream flows to the high pressure vessel at high velocity, said jet pump having a low pressure zone in communication with the restricted flow passage and maintained at low pressure by the flow of the well stream through the passage at a velocity higher than that at which it flows through the well stream conductor, and means for conducting low pressure gas from the low pressure separator to the low pressure zone.

8. An apparatus for separating desirable liquefiable hydrocarbons from a predominantly gaseous high pressure well stream including, a high pressure liquid and gas separating vessel, a low pressure liquid and gas separating vessel, a gas discharge from the high pressure vessel, a liquid discharge from the high pressure vessel to the low pressure vessel, a liquid discharge from the low pressure vessel, a high pressure well stream conductor, a pressure-reducing means connecting the conductor to the high pressure vessel, for extracting work from the well stream to cool the same and employing said work to compress low pressure gas from the low pressure separator, said means having a restricted flow passage through which the well stream flows to the high pressure vessel at high velocity, said means having a low pressure zone in communication with the restricted flow passage and maintained at low pressure by the flow of the well stream through the passage at a velocity higher than that at which it flows through the well stream conductor, and means for conducting low pressure gas from the low pressure separator to the low pressure zone.

9. An apparatus for separating desirable liquefiable hydrocarbons from a predominantly gaseous high pressure well stream including, a high pressure liquid and gas separating vessel, a low pressure liquid and gas separating vessel, a gas discharge from the high pressure vessel, a liquid discharge from the high pressure vessel to the low pressure vessel, a liquid discharge from the low pressure vessel, a high pressure well stream conductor, a pressure-reducing Venturi connecting the conductor to the high pressure vessel, said Venturi having a restricted flow passage through which the well stream flows to the high pressure vessel at high velocity, said Venturi having a low pressure zone in communication with the restricted flow passage and maintained at low pressure by the flow of the well stream through the passage at a velocity higher than that at which it flows through the well stream conductor, and means for conducting low pressure gas from the low pressure separator to the low pressure zone.

10. The method of separating desirable liquefiable hydrocarbons from a predominantly gaseous high pressure well stream including the steps of, dividing the well stream into portions, passing each portion of the well stream through a pressure reduction step at high velocity to create and maintain a low pressure area in direct communication with each portion of the high velocity well stream, discharging the well stream from a first of the pressure reduction steps into an intermediate pressure separating zone wherein the well stream separates into liquid and gaseous components, discharging gas at intermediate pressure from the intermediate pressure zone, withdrawing liquid from the intermediate pressure separating zone, and discharging the liquid into a low pressure separating zone wherein gas is removed from the liquid, withdrawing liquid from the low pressure separating zone, conducting gas from the low pressure separating zone to the low pressure area of a second of the pressure reduction steps, discharging from the latter pressure reduction step the combined gas from the low pressure separating zone and the well stream portion flowing through the second of said pressure reduction steps, and conducting the combined discharge from the second pressure reduction step to the low pressure area of the first of said pressure reduction steps.

11. The method of conserving low pressure gas in the separation of liquids from a predominantly gaseous high pressure well stream including the steps of, dividing the well stream into a plurality of flow streams, passing each flow stream under high pressure through a separate restricted flow space for that flow stream to increase the flowing velocity of the flow stream and create a separate low pressure area in direct communication with that flow space whereby low pressure gas is drawn from the low pressure area into the flow stream and discharged with the flow stream from the flow space, conducting low pressure gas from a low pressure separating zone to the low pressure area in communication with one of the flow spaces, whereby the gas from the low pressure separating zone is combined with the flow stream and discharged with said flow stream, conducting the combined discharge from each flow space into the low pressure area of the next succeeding flow space, discharging the combined discharge from the final flow space into an intermediate pressure separating zone, discharging gas and liquid from said zone, passing the liquid into the low pressure separating zone, and discharging liquid from the low pressure separating zone.

12. An apparatus for separating desirable liquefiable hydrocarbons from a predominantly gaseous high pressure well stream including, a high pressure liquid and gas separating vessel, a low pressure liquid and gas separating vessel, a gas discharge from the high pressure vessel, a liquid discharge from the high pressure vessel to the low pressure vessel, a liquid discharge from the low pressure vessel, at least two high pressure well stream conductors, a pressure reducing means connected to each conductor, a discharge conductor for each pressure reducing means, the discharge conductor of a first of said pressure reducing means being connected to the high pressure vessel, each of said pressure reducing means having a restricted flow passage through which a portion of the well stream flows to the high pressure vessel at high velocity, each of said pressure reducing means having a low pressure zone in communication with the restricted flow passage of that pressure reducing means and maintained at low pressure by the flow of a portion of the well stream through the passage at a velocity higher than that at which it flows through the well stream conductor, means for conducting low pressure gas from the low pressure separator to the low pressure zone of a second of said pressure reducing means, and means for placing the discharge conductor of the second pressure reducing means in communication with the low pressure zone of the first pressure reducing means.

13. An apparatus for separating desirable liquefiable hydrocarbons from a predominantly gaseous high pressure well stream including, a high pressure liquid and gas separating vessel, a low pressure liquid and gas separating vessel, a gas discharge from the high pressure vessel, a liquid discharge from the high pressure vessel to the low pressure vessel, a liquid discharge from the low pressure vessel, a plurality of high pressure well stream conductors, a pressure reducing means connected to each conductor, a discharge conductor for each pressure reducing means, the discharge conductor of a first of said pressure reducing means being connected to the high pressure vessel, each of said pressure reducing means having a restricted flow passage through which a portion of the well stream flows to the high pressure vessel at high velocity, each of said pressure reducing means having a low pressure zone in communication with the restricted flow passage of that pressure reducing means and maintained at low pressure by the flow of a portion of the well stream through the passage at a velocity higher than that at which it flows through the well stream conductor, means for conducting low pressure gas from the low pressure separator to the low pressure zone of a second of said pressure reducing means, and means for placing the discharge conductor of each pressure reducing means beginning with the second thereof and other than the first thereof in communication with the low pressure zone of the next succeeding pressure reducing means.

No references cited.